No. 12,242. REISSUED JULY 19, 1904.
E. D. PRIEST.
BRUSH HOLDER.
APPLICATION FILED MAY 15, 1901.
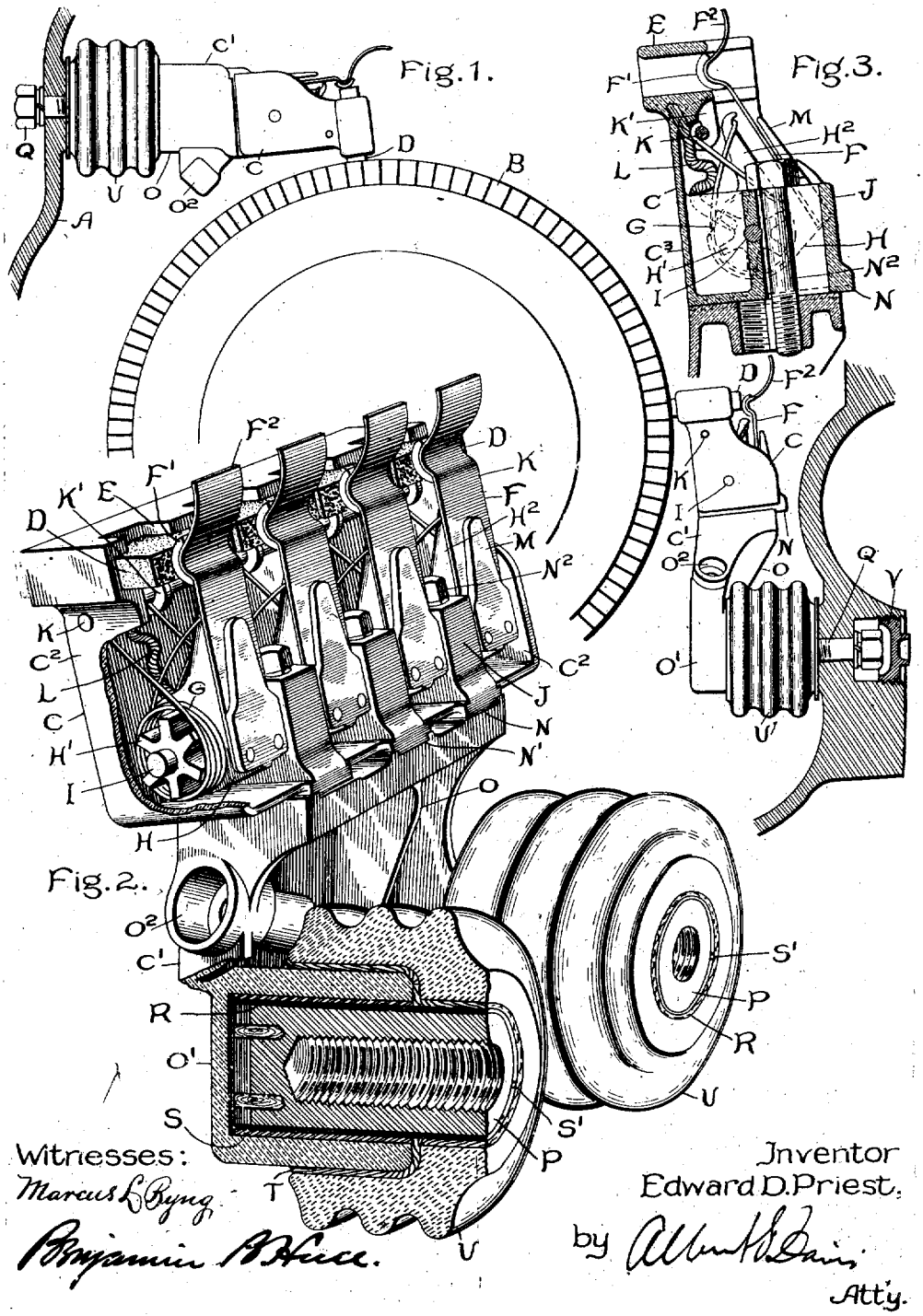
Witnesses:
Marcus L. Byng
Benjamin B. Hice.
Inventor
Edward D. Priest.
by Albert G. Davis
Att'y.

No. 12,242. Reissued July 19, 1904.

UNITED STATES PATENT OFFICE.

EDWARD D. PRIEST, OF SCHENECTADY, NEW YORK, ASSIGNOR TO THE GENERAL ELECTRIC COMPANY, A CORPORATION OF NEW YORK.

BRUSH-HOLDER.

SPECIFICATION forming part of Reissued Letters Patent No. 12,242, dated July 19, 1904.

Original No. 648,052, dated April 24, 1900. Application for reissue filed May 15, 1901. Serial No. 60,400.

DIVISION A.

*To all whom it may concern:*

Be it known that I, EDWARD D. PRIEST, a citizen of the United States, residing at Schenectady, county of Schenectady, State of New York, have invented certain new and useful Improvements in Brush-Holders, of which the following is a specification.

The present invention relates to brush-holders, and more particularly to those which are mounted within an inclosure, such as the field-magnet frames of electric-railway motors, and has for its object to improve their construction.

An important feature of the invention relates to means for supporting and insulating conducting members of electrical apparatus, which means I believe to be broadly new.

In the accompanying drawings, which illustrate an embodiment of my invention, Figure 1 is a side elevation of two brush-holders with the brushes resting on a commutator. Fig. 2 is a perspective view of the holder with certain of the parts in section, and Fig. 3 is a longitudinal section of a portion of a holder.

The brush-holders are mounted on the field-magnet frame A, and the brushes are arranged to rest on the periphery of the commutator B. The holder is made in two parts C and C′. The former comprises suitable receptacles and guides for the brushes, while the latter is in the nature of a support and is bolted to the field-frame or other fixed portion of the machine.

The brush-holder comprises a rectangular box with the top side missing. This forms a desirable construction, as all of the working parts are protected from arcing, yet are accessible for inspection and repairs.

The brushes D are rectangular in shape and are mounted in correspondingly-shaped guides E. As shown, a number of brushes are provided, each capable of independent movement. The brushes are forced against the commutator by spring-pressed arms F. The main pressure on the brushes against the commutator is obtained from coiled springs G; but in order to compensate for minor irregularities the end of each arm is itself a spring and is provided on the under side where it engages with the brush with a curved wearing-strip F′. The outer end of the arm is extended to form a hook $F^2$, whereby the arm may be raised to permit the insertion of a new brush or the examination of an old one. The spring F is secured at its rear end to the casting H, which is mounted on the shaft I and mounted directly over it, and also secured to the casting H is a plate M for limiting its outward movement. Each brush-arm casting is provided with a hub having a number of radially-extending portions H′, around which the spring G is coiled. The castings are retained in place by a small shaft I, which extends through the brush-holder from end to end. This shaft is supported at its outer ends by the sides $C^2$ of the brush-boxes and at intermediate points by the projections J.

Extending outward from the hub of the casting H toward the brush is a hooked arm $H^2$, Figs. 2 and 3, and engaging with this arm is one end of the coiled spring G, the other end being slightly curved and engaging with the rod K, which extends parallel with and just back of the brushes. The rod K is supported at its outer ends by the sides $C^2$ of the brush-box and at intermediate points by the ears K′. It will be seen that the center of movement of the spring is the same as that of the brush-arm and that the ends of the springs are secured at points between the brushes and the support for the castings H. This is a very desirable arrangement, as it reduces the pressure on shaft I to a minimum, thereby decreasing the wear on the same, and at the same time provides a construction wherein the pressure on the brush is uniform over a wide range of movement.

In order to increase the conductivity between the parts and at the same time shunt any current around the springs flexible cables L are employed, which are secured at one end to the holder at points near the brush and at the other end to webs which connect the radial projection H′ on the casting H. As a further precaution against heating, flashing, and the deposition of carbon or other dust the under side of the holder is closed by a plate $C^3$, formed integral with the sides and brush-guides.

For the purpose of adjustment the brush-holder proper is provided with projections N, working in grooves N′, and bolts $N^2$ are employed to clamp the parts together.

Referring now to the support for the holder, O represents a casting having two cup-shaped portions O′, one of which is shown in section, and a socket $O^2$ for receiving a cable for conveying current. Mounted within the cup-shaped portion O′ is a screw-threaded metal plug P, arranged to receive the retaining-bolt Q, as shown in Fig. 1. Surrounding this plug is a layer of insulation R, preferably of mica, on account of its firmness and insulating qualities, over which is a metal sleeve S. The sleeve is split at S′, so that when assembled the sleeve will grip the insulation tightly and will not wrinkle it. The length of the sleeve is approximately the same as the depth of the socket, and when assembled the two are forced together in a hydraulic press. The bottom of the socket is provided with a layer of insulation, as is also the head of the screw-threaded piece P, and in this manner all leakage is prevented. After the above-mentioned parts have been assembled a layer of adhesive tape T is wound thereon, as shown in section, and an insulator U, preferably of refractory material, is slipped over the tape. The tape serves to increase the creepage surface and also as a cushion for the insulator to prevent breakage. The insulator is provided with an internal shoulder, which engages with that portion of the tape over the end of the socket and is retained in place by the bolt Q. The outer surface of the insulator is corrugated, so as to present an extended creeping surface.

The right-hand brush-holder is mounted directly under the recess for the axle, and to prevent grease from working its way to the brush-holder the head of the retaining-bolt is let into the field-casting and a screw-threaded plug V arranged to close the opening.

What I claim as new, and desire to secure by Letters Patent of the United States, is—

1. In a brush-holder, the combination of guides for the brush, a spring-pressed brush-arm comprising a casting having a central hub and a spring-arm secured to the hub, a spiral spring coiled around said hub, with the ends secured at points between the brushes and support for the spring-arm, means for adjusting the holder on its support, and a support which is designed to be secured to a fixed part of the machine.

2. In a brush-holder, the combination of a plurality of brush-holder guides, a plurality of spring-pressed arms, each arm comprising a casting having a central hub and a spring-arm secured thereto, means for limiting the movement of the spring-arms, a shaft which extends through the brush-box and is supported by the sides thereof, said shaft forming a support common to all of the said castings, a coiled spring surrounding each hub, and a rod extending parallel with the shaft, with which all of the coiled springs engage.

3. In a brush-holder, the combination of a plurality of individually-movable castings, each casting being provided with an arm formed integral therewith, a rod extending parallel with the face of the holder, and a coiled spring surrounding the hub of each casting and secured at one end to the arm and at the other end to the rod.

4. As an article of manufacture, a brush-holder frame, comprising a rectangular box substantially closed at all points with the exception of the top, and provided with guides for the brushes, projections on the inner surface of the box, and ribs on one of the outer surfaces of the box which are arranged to engage with grooves on a suitable support and act as guides.

5. As an article of manufacture, an arm for a brush-holder, comprising a casting having a central hub with radial projections, and an arm formed integral therewith for receiving one end of a spring.

6. In a brush-holder, the combination of a socket, a plug located therein, a body of insulating material located between the plug and the socket, and an insulator arranged to be slipped endwise over the end of the plug and the socket.

7. In a brush-holder support, the combination of a socket formed integral therewith, a screw-threaded plug surrounded by a layer of insulation, a metal sleeve, the said sleeve being arranged to make a driving or forced fit with the socket, and an insulator having a chambered portion which is arranged to surround a portion of the plug and the socket.

8. In a brush-holder support, the combination of a socket formed integral therewith, a screw-threaded plug surrounded by a layer of insulation, and a metal sleeve, the said sleeve being arranged to make a driving or forced fit with the socket, an insulator having a chambered portion which is arranged to surround a portion of the plug and the socket, and means for holding the support and the insulator in place.

9. In a brush-holder, the combination of a receptacle for the brushes, a support for the receptacle which is provided with an extension, a body of pliable insulating material which surrounds the extension, and an insulator formed of refractory material which is provided with a shouldered cavity and is arranged to be slipped endwise over the extension and the pliable insulating material.

10. In a brush-holder, the combination of a socket, a screw-threaded plug mounted therein and surrounded by a sleeve of insulating material and a closely-fitting metal sleeve, a layer of insulating material located between the end of the plug and the bottom of the socket, a winding of tape around the socket and the plug, and an insulator which surrounds the plug and socket and is in direct contact with the tape.

11. In a railway-motor, the combination of a field-magnet frame which is cut away to receive the axle, a brush-holder mounted on the inside of the field-magnet near said cut-away portion, a retaining-bolt therefor the head of which is let into the frame, and a screw-threaded plug arranged to cover the head of the bolt and to prevent the entrance of oil from the axle at that point.

12. In a brush-holder, the combination of a socket, a plug mounted in said socket and surrounded by a layer of insulating material and a split metal sleeve, the said plug and sleeve being arranged to be forced into the socket, and a layer of insulating material located between the end of the plug and the bottom of the socket.

13. In a brush-holder, the combination of a brush-receptacle, a pivoted arm for forcing the brush against the commutator, a coiled spring which surrounds the pivot of the arm and is provided with long ends which extend in the same general direction away from the pivot and are secured at points near the brush, whereby a substantially even pressure on the brush over a wide range of movement is obtained, and the wear on the pivot is decreased to a minimum.

14. In a brush-holder, the combination of a brush-socket, a movable spring-pressed arm, a spring and a cable extending from the socket to the movable arm for shunting current around the spring.

In witness whereof I have hereunto set my hand this 13th day of May, 1901.

EDWARD D. PRIEST.

Witnesses:

BENJAMIN B. HULL,
MARGARET E. WOOLLEY.